Oct. 10, 1939.  E. E. MILLER  2,175,442
MUD PUMP PISTON
Filed April 20, 1937
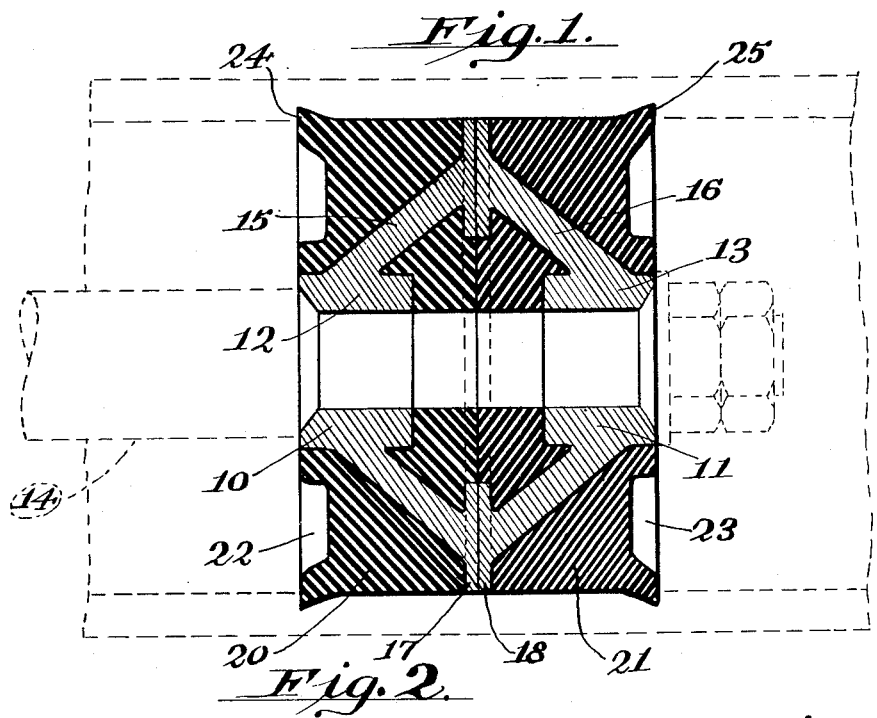
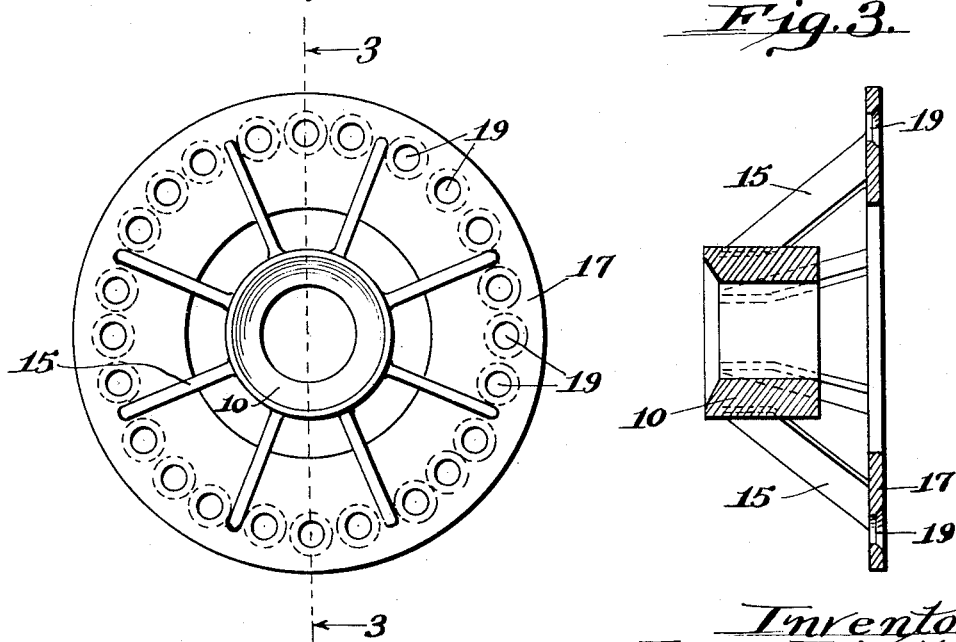
Inventor
Erwin E. Miller.
by Hazard and Miller
Attorneys Patented Oct. 10, 1939

2,175,442

UNITED STATES PATENT OFFICE 2,175,442

MUD PUMP PISTON

Erwin E. Miller, Fullerton, Calif.

Application April 20, 1937, Serial No. 137,984

7 Claims. (Cl. 309—23)

This invention relates to improvements in mud pump pistons.

An object of the invention is to provide an improved mud pump piston wherein there is a frame on which is vulcanized rubber, the rubber providing the cylinder wall engaging surfaces of the piston.

In mud pump piston designs it is desirable to have flexible lips of rubber adjacent the ends of the piston which bear against the cylinder walls with the greatest pressure. In other words, the center of the piston is either relieved or merely snugly fits the cylinder walls of the cylinder whereas the ends of the piston either from the resiliency of the rubber or from pressure, or both, are expanded against the cylinder walls with the greatest force. It is customary procedure in piston design to mold the rubber so that it has outwardly flaring lips at its ends. Such a construction involves difficulties in the design for the mold in which the rubber is vulcanized usually requiring a split mold so that the ring with its outwardly flaring lips can be removed.

An object of the present invention is to provide an improved mud pump piston of such a design that the mold construction used in its manufacture can be simplified and the resulting piston have all the advantages of that type of piston wherein the rubber is shaped or molded to have the outwardly flaring lips.

Specifically, an object of the invention is to provide an improved mud pump piston in the form of two opposed parts in each of which there is a frame providing a hub receivable on the piston rod of a mud pump and carrying strengthening parts which will cooperate to reinforce the center of the piston and at the same time afford an opportunity to conveniently mold and vulcanize the rubber so as to have the advantageous lips at the ends of the piston.

With the foregoing and other objects in view which will be made manifest in the following detailed description and specifically pointed out in the appended claims, reference is had to the accompanying drawing from an illustrative embodiment of the invention, wherein:

Figure 1 is a view in vertical section through the piston embodying the present invention;

Fig. 2 is a view in end elevation of one of the frames or body parts of the improved piston; and Fig. 3 is a vertical section taken substantially on the line 3—3 on Fig. 2.

Referring to the accompanying drawing wherein similar reference characters designate similar parts throughout, the improved piston is transversely divided being formed of two parts which are of like construction. The parts of the piston are formed of frames or body parts 10 and 11 formed of metal, each part having a hub portion 12 and 13, respectively, adapted to receive a piston rod indicated at 14 of a mud pump. Arms 15 and 16 respectively are integral with the hub portions and extend upwardly and inwardly toward the center of the piston to points adjacent its periphery. The inner ends of these arms may be joined by an integral ring, the rings being indicated at 17 and 18, respectively, which may or may not be perforated with countersunk apertures 19 (see Fig. 3). When these apertures are present they are countersunk in a direction so that their large ends are exposed toward the inner faces of the piston parts. Rubber indicated at 20 and 21 on the two piston parts respectively is vulcanized around the frames and forms the body of the piston. The peripheral surface of the rubber engages the cylinder walls. The ends of the rubber bodies are annularly grooved as indicated at 22 and 23, respectively, defining lips 24 and 25, respectively. In the preferred form of construction these lips have an outward flare as indicated, this flare being molded on the rubber so that the lips due to their own resiliency, press against the cylinder walls with greater force than the body of the piston.

In the construction of the parts of the piston, the frame of the parts may be positioned in the mold and the rubber of similar composition can be placed in the mold and forced through the spaces between the arms and into the apertures 19. This rubber is then vulcanized to the frame parts after which the piston part can be easily extracted from the mold which does not have to be longitudinally split. The presence of a flaring lip on each body part does not interfere with longitudinal removal of the body part from the mold when the vulcanizing is completed.

The two parts of the piston are assembled together on the piston rod as shown and due to the fact that the rings 17 and 18 are in engagement, tightening of the nuts on the piston rod does not cause a collapse of the piston. These rings being located near the periphery of the piston tend to retain the size and shape of the rubber near the center of the piston leaving the flaring lips to effect the major portion of the seal between the piston and the piston walls.

From the above described construction it will be appreciated that the improved piston can be easily manufactured with the simplified mold construction and will have present in it all of the advantageous features of good mud pump piston design.

Various changes may be made in the details of construction without departing from the spirit or scope of the invention as defined by the appended claims.

I claim:

1. A mud pump piston transversely divided into two parts, each part having a frame provided with a hub portion designed to receive a piston rod, upwardly and inwardly inclined arms attached to the hub portions, and carrying portions engageable with the corresponding portions of the opposed part of the piston and rubber-like material molded around said hub portions and arms and presenting cylinder wall engaging surfaces of the piston.

2. A mud pump piston comprising two opposed parts, each part having a frame provided with a hub, upwardly and inwardly inclined arms attached to the hub, rings connecting the inner ends of the arms and arranged to engage each other when the parts of the piston are assembled together, and rubber-like material molded around the hub portions and between the arms presenting cylinder wall engaging surfaces of the piston.

3. A mud pump piston comprising two opposed parts, each part having a frame provided with a hub, upwardly and inwardly inclined arms attached to the hub, rings connecting the inner ends of the arms and arranged to engage each other when the parts of the piston are assembled together, and rubber-like material molded around the hub portions and between the arms presenting cylinder wall engaging surfaces of the piston, said rings having apertures therethrough.

4. A mud pump piston comprising two opposed parts, each part having a frame provided with a hub, upwardly and inwardly inclined arms attached to the hub, rings connecting the inner ends of the arms and arranged to engage each other when the parts of the piston are assembled together, and rubber-like material molded around the hub portions and between the arms presenting cylinder wall engaging surfaces of the piston, the rubber presenting outwardly flaring lips at the outer ends of the piston.

5. A mud pump piston comprising two opposed parts, each part having a frame provided with a hub adapted to fit around a piston rod, upwardly and inwardly inclined arms attached to the hub terminating on the mutually engageable faces of the two opposed parts, and rubber molded around the hub portions and between the arms presenting cylinder wall engaging surfaces of the piston.

6. A mud pump piston comprising two opposed parts, each part having a frame provided with a hub adapted to fit around a piston rod, upwardly and inwardly inclined arms attached to the hub, rings connecting the upper inward ends of the arms, said rings presenting edges designed to substantially fit the cylinder walls of the mud pump within which the piston is to be used, and rubber molded around the hub portions and between the arms presenting cylinder wall engaging surfaces of the piston from said rings outwardly.

7. A mud pump piston comprising two opposed parts, each part having a frame provided with a hub adapted to fit around a piston rod, upwardly and inwardly inclined arms attached to the hub, rings connecting the upper inward ends of the arms, said rings presenting edges designed to substantially fit the cylinder walls of the mud pump within which the piston is to be used, and rubber molded around the hub portions and between the arms presenting cylinder wall engaging surfaces of the piston from said rings outwardly, said rings having openings therethrough into which the rubber extends.

ERWIN E. MILLER.